(12) United States Patent
Konishi et al.

(10) Patent No.: US 6,700,289 B2
(45) Date of Patent: Mar. 2, 2004

(54) DIRECT CURRENT COMMUTATOR MOTOR

(75) Inventors: Tsuyoshi Konishi, Fukui (JP); Shiro Tateishi, Fukui (JP); Hiroshi Nishimura, Shiga (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/229,290

(22) Filed: Aug. 28, 2002

(65) Prior Publication Data

US 2003/0067242 A1 Apr. 10, 2003

Related U.S. Application Data

(63) Continuation of application No. 09/575,667, filed on Jun. 15, 2000, now abandoned.

(30) Foreign Application Priority Data

Jun. 17, 1999 (JP) ............................................. 11-170492

(51) Int. Cl.[7] ............................................. H01R 39/46
(52) U.S. Cl. ........................ 310/220; 310/229; 310/251; 310/252
(58) Field of Search .................................. 310/219, 220, 310/221, 222, 229, 238, 239, 242, 245–248, 251, 252, 253

(56) References Cited

U.S. PATENT DOCUMENTS

| | | | | |
|---|---|---|---|---|
| 2,194,620 A | * | 3/1940 | Sekyra | 310/247 |
| 2,261,915 A | * | 11/1941 | Korte et al. | 417/423.3 |
| 2,353,047 A | | 7/1944 | Lannert | 310/251 |
| 3,656,018 A | * | 4/1972 | Maher | 310/242 |
| 3,710,160 A | * | 1/1973 | Voglesonger | 310/247 |
| 4,384,223 A | | 5/1983 | Zelt | 310/68 R |
| 4,605,581 A | | 8/1986 | Stevens et al. | 428/96 |
| 5,144,181 A | | 9/1992 | Shibuya | 310/251 |
| 5,306,974 A | | 4/1994 | Bates | 310/68 R |
| 5,912,523 A | | 6/1999 | Ziegler et al. | 310/237 |
| 6,037,693 A | | 3/2000 | Marth et al. | 310/220 |

FOREIGN PATENT DOCUMENTS

| | | |
|---|---|---|
| EP | 0078417 | 5/1983 |
| GB | 2234757 | 2/1991 |
| GB | 2274552 | 7/1994 |
| JP | 54-16242 | 6/1979 |
| JP | 55068847 | 5/1980 |
| JP | 57196851 | 12/1982 |

OTHER PUBLICATIONS

English Language Abstract of JP 54–16242, Jun. 27, 1979.
English Language Abstract of JP 57–196851, Dec. 2, 1982.
English Language Abstract of JP 55–068847, May 23, 1980.
"University Physics", 6th ed., Sears et al., Addition–Wesley Publishing Company, p. 537.

* cited by examiner

*Primary Examiner*—Dang Le
(74) *Attorney, Agent, or Firm*—Greenblum & Bernstein, P.L.C.

(57) ABSTRACT

A DC commutator motor that is driven by a direct current power source obtained by rectifying an alternating current power source includes a plus-side brush made of material having a high resistivity and a minus-side brush made of material having a low resistivity. A capacitor is inserted in and connected parallel to the direct current power source. The commutator motor makes use of specials tubes having different shapes to avoid an incorrect insertion of one of the specials tubes into the insertion hole designed to receive the other of the specials tubes.

2 Claims, 2 Drawing Sheets

DIRECT CURRENT COMMUTATOR MOTOR

This is a continuation of U.S. patent application Ser. No. 09/575,667, filed Jun. 15, 2000, now abandoned, the contents of which are expressly incorporated by reference herein in its entirety.

BACKGROUND OF THE INVENTION

1. Field of the Invention

The present invention generally relates to an electric motor and, more particularly, to a direct current commutator motor of a type that can be driven by a direct current power source obtained by rectifying an alternating current power source.

2. Description of the Prior Art

The prior art direct current commutator motor that is driven by a direct current power source obtained by rectifying an alternating current power source has a problem in that because a brush electrically connected with a negative pole of the DC power source is susceptible to wear by combustion as a result of collision of cations, no sufficient lifetime can be secured.

To eliminate the above discussed problem, the Japanese Utility Model Publication No. 54-16242, published Jun. 27, 1979, discloses the use of a standard brush for connection with a positive pole of the DC power source and a metal-mixed graphite brush for connection with a negative pole of the DC power source. The metal-mixed graphite brush is prepared by sintering and molding a mixture of graphite with metallic particles dispersed in the graphite. Since the metallic particles mixed in the graphite have a property less susceptible to wear by combustion as a result of collision of cations, the use of the metal-mixed graphite brush for connection with the negative pole of the DC power source is effective to prolong the service life of the brush.

With reference to FIG. 6, the prior art direct current commutator motor will be discussed. Referring to FIG. 6 showing the prior art commutator motor partly in a longitudinal sectional representation and partly in a longitudinal side representation, reference numeral 1 represents a frame having a magnet 2 built therein. Reference numeral 3 represents a bracket made of a thermoplastic resin. The bracket 3 has defined therein an insertion hole 3a for receiving a specials tube 10 and a positioning hole 3b extending transverse to the insertion hole 3a and is fixed immovable relative to the frame.

Reference numeral 4 represents a rotor rotatably supported by bearings carried respectively by the frame 1 and the bracket 3. Reference numeral 7 represents a commutator fixed on a shaft for rotation together with the rotor 4. This commutator 7 is electrically connected with opposite ends of a wire winding of the rotor 4. Reference numeral 8 represents a carbon brush for connection with a positive pole of the direct current power source, which brush 8 is hereinafter referred to as a plus-side brush. This positive brush 8 is slidably accommodated within a plus-side specials tube 10 and is normally biased by a coil spring within the plus-side specials tube 10 so as to slidingly contact the commutator 7.

Reference numeral 9 represents a metal-mixed graphite brush for connection with a negative pole of the DC power source, which brush 9 is hereinafter referred to as a minus-side brush. In a manner similar to the plus-side brush 8, the minus-side brush 9 is slidably accommodated within a minus-side specials tube 10 and is normally biased by a coil spring within the minus-side specials tube 10 so as to slidingly contact the commutator 7. The plus-side and minus-side specials tubes 10 are of an identical shape and structure and have a spring-like cutout 10a formed therein. The spring-like cutout 10a is capable of being deformed as the specials tube is inserted into the insertion hole 3a to press and deform an inner wall surface of the insertion hole 3a to thereby advance deep into the insertion hole 3a until it is brought into engagement with the positioning hole 3b to thereby restrain the specials tube from being separated out of the insertion hole 3a.

In this direct current motor of the structure described above, when a direct current voltage obtained by full-wave rectifying an alternating current power source is applied to the brushes through the respective specials tubes, the current flows through the wire winding of the rotor by way of the commutator then held in sliding contact with the brushes, developing an electromagnetic force between the wire winding and the magnet 2 to thereby cause the rotor to rotate. At this time, even though the brushes then held in sliding contact with commutator pieces to supply an electric power to the wire winding through the commutator are separated a distance therefrom as a result of rotation of the rotor, the electric current continues to flow therethrough to the wire winding by way of spark discharge developed therebetween, so long as such distance is minute.

The spark discharge occurs on both plus-side and minus-side and constitutes a cause of wear by combustion of graphite forming the brush, which leads to reduction of the service life. Accordingly, occurrence of the spark discharge should be minimized to secure a sufficient service life of the brush.

However, considering that the prior art direct current commutator motor makes use of the direct current power source that is obtained by full-wave rectifying the alternating current power source, and that the electric power source is repeatedly turned on and off at a cycle twice the frequency of the alternating current power source, a problem has been found in that the spark discharge occurs frequently, accompanied by an unstable rectification.

Although to minimize the occurrence of the spark discharge, it is necessary to increase the electric resistance of the brush to a certain extent so that the spark discharge can vanish at a small distance between the brush and the commutator pieces, the metal-mixed graphite brush used as a minus-side brush in the prior art DC commutator motor has an extremely low resistivity, say, that of $\frac{1}{100}$ to $\frac{1}{1,000}$ of the resistivity of the standard carbon brush and, therefore, it has been found difficult to increase the electric resistance of the brush.

The reduction in service life of the brush resulting from the above discussed spark discharge is considerable with increase of the rotational speed of the motor, and the increase of the rotational speed of the prior art DC commutator motor is therefore limited. Also, the prior art DC commutator motor has an additional problem in that since the specials tubes employed respectively for the plus-side and the minus-side are of an identical shape there is a high possibility that they are inserted erroneously into the wrong insertion holes.

Furthermore, since in the prior art compact DC motor prevention of the specials tubes from being separated is implemented by the engagement between the cutout 10a and the positioning hole 3b, the inner wall surface of the insertion hole has t be pressed and deformed as the respective specials tube is inserted into the insertion hole and, for this purpose the thermoplastic resin is used as a material for the bracket. Accordingly, as compared with the use of the thermoplastic resin, not only is the reliability with respect to heat low, but a dimensional precision is hardly attained and no sufficient physical strength can be attained.

SUMMARY OF THE INVENTION

Accordingly, the present invention has been devised to substantially eliminate the above discussed problems inherent in the prior art direct current commutator motor and is intended to provide an improved direct current commutator motor having a prolonged lifetime and a high reliability and capable of being driven at a high speed.

To this end, the present invention provides a DC commutator motor that is driven by a direct current power source obtained by rectifying an alternating current power source, wherein a plus-side is made of material having a high resistivity and a minus-side brush is made of material having a low resistivity and, at the same time, a capacitor is inserted in and connected parallel to the direct current power source. This design is effective to provide the DC commutator motor having the brushes of long service life with occurrence of the spark discharge minimized and capable of being driven at a high speed.

More specifically, the plus-side and minus-side brushes are preferably made of carbon and metal-mixed graphite, respectively. This is particularly advantageous in that the resistance of the minus-brush to the cations can be increased and, at the same time, the occurrence of the spark discharge can be reduced to minimize the possible wear of the brush.

Plus-side and minus-side specials tubes employed in the practice of the present invention are preferably of a shape differing from each other, so that the possibility of the specials tubes being inserted into the wrong insertion hole can advantageously be avoided. More specifically, the DC commutator motor embodying the present invention makes use of first and second specials tubes made of metal and adapted to slidably receiving respective brushes of different material, and a bracket made of a synthetic resin and having first and second insertion holes defined therein. The first specials tube and the second specials tube can be snugly inserted into the first and second insertion holes, respectively, but the first and second specials tube cannot be inserted into the second and first insertion holes, respectively. Accordingly, there is no possibility that the specials tubes may be erroneously inserted into the wrong insertion hole during assemblage of the commutator motor.

Also, in the practice of the present invention, prevention of the specials tubes from being separated is implemented without relying on the spring property, but by the utilization of deformation of a tab. More specifically, each of the specials tubes employed in the commutator motor embodying the present invention has one side face provided with a tab that is divided into first and second tab segments with a cutout intervening therebetween. On the other hand, the corresponding insertion hole has a groove communicated therewith, said groove being of such a shape that when the specials tube is inserted into the insertion hole, the tab can be accommodated loosely therein with a slight gap and, when the specials tube is inserted to a predetermined position inside the insertion hole, only one of the tap segments is exposed to the outside from the insertion hole and is then deformed to bend. Since the inner wall of the insertion hole need not be elastically deformed during the insertion of the corresponding specials tube, a thermosetting resin can advantageously be used as material for the bracket. Therefore, not only is the reliability with respect to heat high, but also a dimensional precision can be attained and a sufficient physical strength can be secured.

BRIEF DESCRIPTION OF THE DRAWINGS

The present invention will become readily understood from the following description of preferred embodiments thereof made with reference to the accompanying drawings, in which like parts are designated by like reference numeral and in which.

DESCRIPTION OF THE EMBODIMENTS (First Embodiment)

Figure 1:
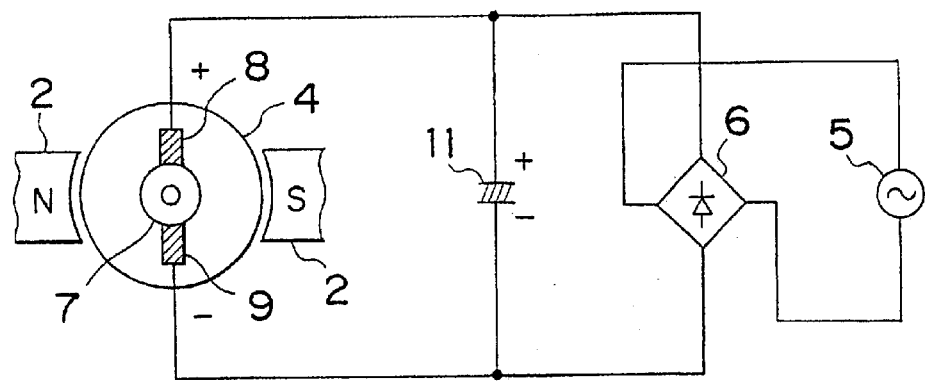
FIG. 1 is a schematic circuit diagram showing a direct current commutator motor including power sources in accordance with a preferred embodiment of the present invention.

Referring to FIG. 1, reference numeral 5 represents an alternating current power source; reference numeral 6 represents a rectifier for full-wave rectifying an output from an alternating current power source and converting it into a pulsating current; reference numeral 8 represents a plus-side carbon brush; reference numeral 9 represents a minus-side metal-mixed graphite brush; and reference numeral 7 represents a commutator slidably engaged with the brushes and operable to selectively switching an electric current to be supplied to a rotor wire winding depending on the angular position thereof. Reference numeral 4 represents a rotor having the rotor wire winding (not shown) mounted therearound and to which an electric power is supplied with the electric current selected from commutator pieces. Reference numeral 2 represents a magnet built in a frame for generating an electromagnetic force in cooperation with the electric current flowing across the rotor wire winding to provide a magnetic flux for driving the rotor 4.

In this embodiment, since the minus-side brush is employed in the form of a metal-mixed graphite brush, the electric resistance of this brush is so low that spark discharge is apt to occur. However, a capacitor 11 is connected parallel to the power source to render the intermittent electric current resulting from the pulsating current to be a continuous electric current, thereby suppressing occurrence of the spark discharge.

(Second Embodiment)

Figure 2:
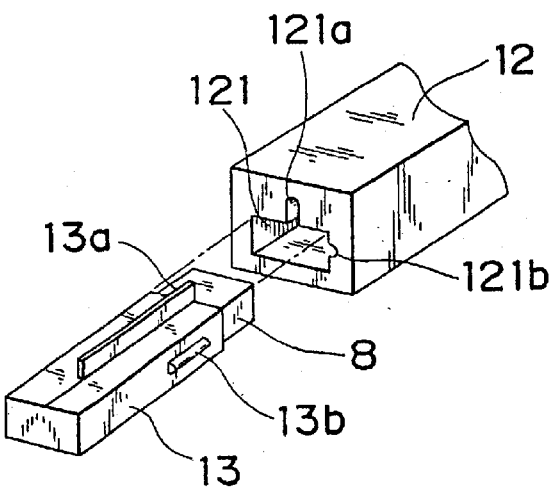
FIG. 2 is a schematic perspective view showing a plus-side specials tube and a corresponding insertion hole according to the present invention.
Figure 3:
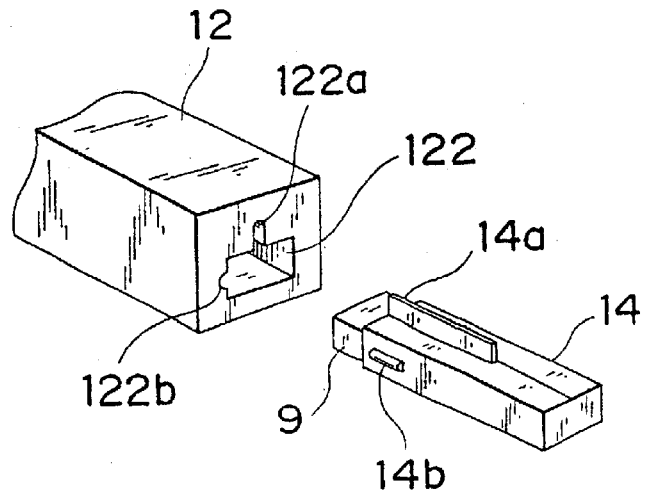
FIG. 3 is a schematic perspective view showing a minus-side specials tube and a corresponding insertion hole according to the present invention.

Referring now to FIGS. 2 and 3, reference numeral 13 represents a plus-side specials tube for receiving the plus-side brush 8; reference numeral 13a represents a first projection provided on the specials tube 13; and reference numeral 13b represents a second projection provided on the specials tube 13 and positioned at a location spaced 90° from the first projection 13a in a counterclockwise direction as viewed from a direction of insertion of the plus-side brush 8. Reference numeral 14 represents a minus-side specials tube for receiving the minus-side brush 9; reference numeral 14a represents a first projection provided on the specials tube 14; and reference numeral 14b represents a second projection provided on the specials tube 14 and positioned at a location spaced 90° from the second projection 14a in a clockwise direction as viewed from a direction of insertion of the minus-side brush 9.

Reference numeral 12 represents a bracket made of a thermosetting resin, and reference numeral 121 represents an insertion hole defined in the bracket 12 for receiving the plus-side specials tube 13. In order for the plus-side specials tube 13 to be received within the insertion hole 121, first and second recesses 121a and 121b are formed in the bracket 12 in communication with the insertion hole 121 and at respective positions alignable with the first and second projections 13a and 13b on the specials tube 13.

Reference numeral 122 represents an insertion hole defined in the bracket 12 for receiving the minus-side specials tube 14. In order for the plus-side specials tube 14 to be received within the insertion hole 122, first and second recesses 122a and 122b are formed in the bracket 12 in communication with the insertion hole 122 and at respective positions alignable with the first and second projections 14a and 14b on the specials tube 14.

According to the second embodiment, the plus-side and minus-side specials tubes 13 and 14 cannot be inserted into the insertion hole 122 and the insertion hole 121, respectively, and, therefore, any possible erroneous insertion the specials tubes into the wrong insertion holes can advantageously be avoided. It is to be noted that except for the respective positions of the second projections 13b and 14b on the respective specials tubes 13 and 14, the specials tubes 13 and 14 are of a substantially identical shape and, therefore, the both can be manufactured using a common mold assembly with a slight modification effected thereto.

(Third Embodiment)

Figure 4:
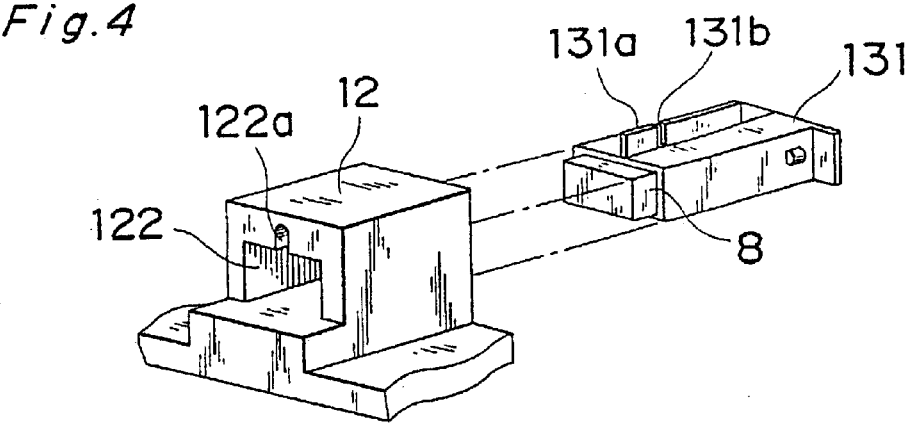
FIG. 4 is a schematic perspective view showing a condition before the specials tube is inserted into the corresponding insertion hole according to the present invention.
Figure 5:
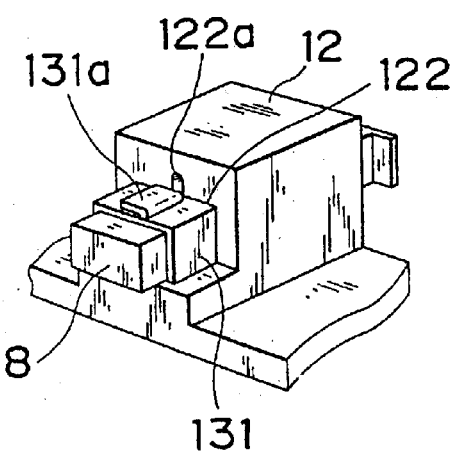
FIG. 5 is a schematic perspective view showing a condition after the specials tube has been inserted into the corresponding insertion hole and a bendable tab has been bent according to the present invention.
Figure 6:
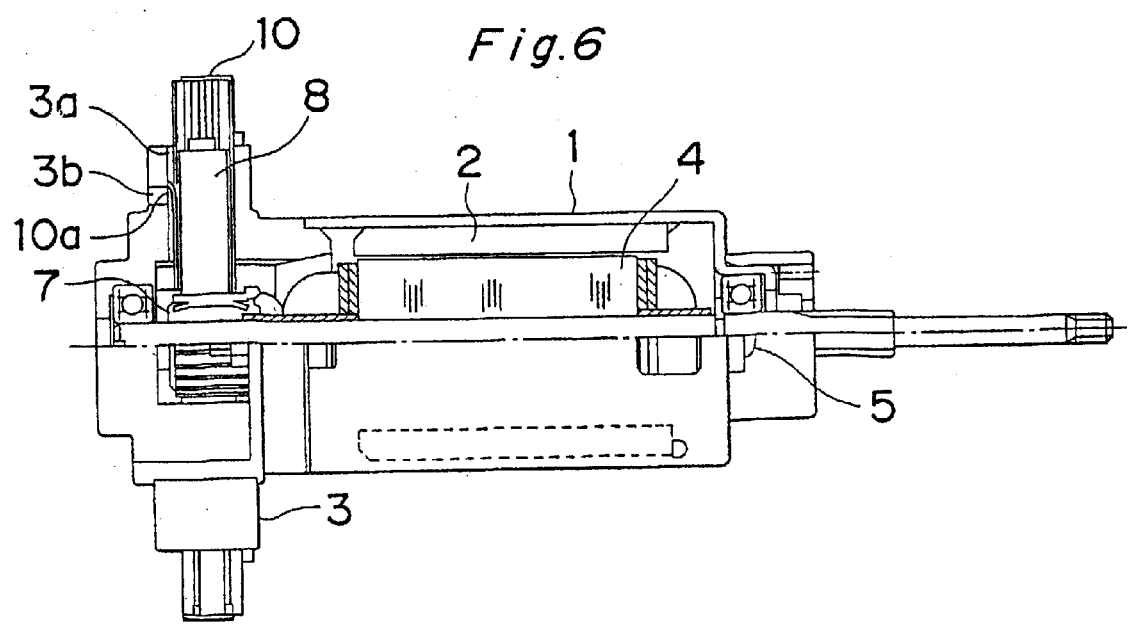
FIG. 6 is a schematic longitudinal representation of the prior art direct current commutator motor with upper and lower longitudinal parts shown in sectional and side views respectively.

Referring to FIGS. 4 and 5, reference numeral 131 represents a specials tube for slidably receiving the brush 8; reference numeral 131a represents a bendable portion of a tab provided on a side surface of the specials tube 131; reference numeral 131b represents a crevice separating the bendable portion 131a from the rest of the tab; reference numeral 12 represents a bracket made of a thermosetting resin; reference numeral 122 represents an insertion hole defined in the bracket 12 for receiving the specials tube 131; and reference numeral 122a represents a longitudinal groove defined in the bracket 12 in communication with the insertion hole 122 for accommodating the tab on the specials tube 131 with a slight gap formed therebetween and so sized and so configured as to permit the bendable portion 131a to be exposed to the outside.

According to the third embodiment, after the specials tube 131 has been inserted into the insertion hole 122, the bendable portion 131a of the tab on the specials tube 131 is bent in a manner as shown in FIG. 5 so that the specials tube 131 will no longer be separable from the insertion hole 122. This design permits the use of the thermosetting resin as a material for the bracket 122 and, therefore, the bracket 122 having an excellent thermal stability, a dimensional accuracy and an increased physical strength can be obtained. This type of bracket is particularly advantageous where a bearing or the like is fitted.

Although the present invention has been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A direct current commutator motor adapted to be driven by a direct current power source obtained by rectifying an alternating current power source, said motor comprising:
   a first brushes adapted to be electrically connected with a plus pole of the direct current power source, said first brush being made of a non-metallic material having a high resistivity;
   a second brush adapted to be electrically connected with a minus pole of the direct current power source, said second brush being made of a material having a low resistivity;
   a commutator having a rotor wire winding, said first and second brushes being slidingly engaged with said commutator to supply the electric current to the rotor wire winding; and
   a capacitor connected parallel to an output of the direct current power source.

2. The direct current commutator motor according to claim 1, wherein said first brush is a carbon brush containing no metal and said second brush is a metal-mixed graphite brush.

* * * * *

UNITED STATES PATENT AND TRADEMARK OFFICE
CERTIFICATE OF CORRECTION

PATENT NO. : 6,700,289 B2
DATED : March 2, 2004
INVENTOR(S) : T. Konishi et al.

It is certified that error appears in the above-identified patent and that said Letters Patent is hereby corrected as shown below:

Column 6,
Line 29, "brushes" should be -- brush --.

Signed and Sealed this

Eighth Day of November, 2005

JON W. DUDAS
*Director of the United States Patent and Trademark Office*